Sept. 30, 1924.  
W. J. KELLEY  
MACHINE FOR INSERTING METAL ENDS IN SPECTACLE TEMPLES  
Filed Sept. 18, 1922  
1,510,005  
2 Sheets-Sheet 2
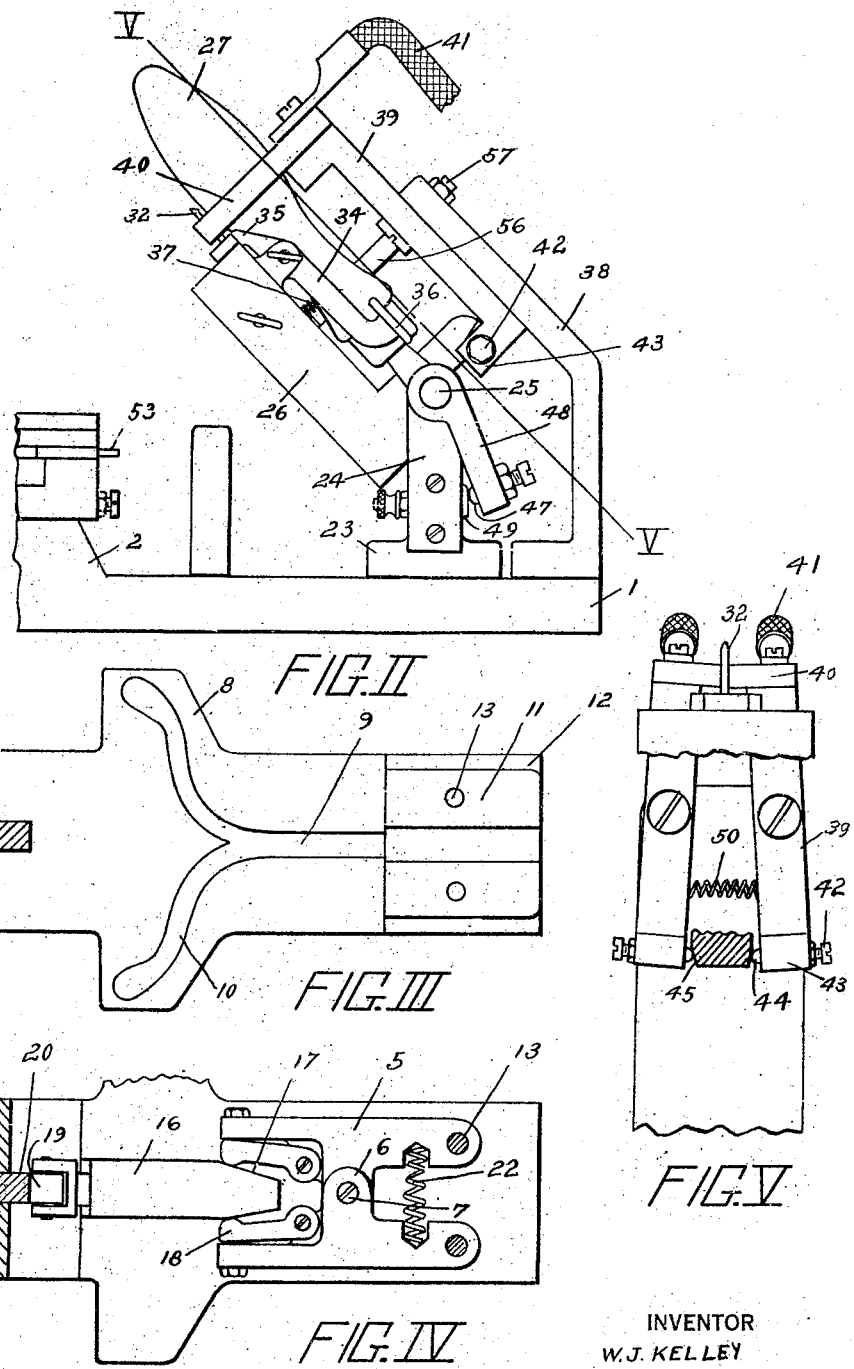
INVENTOR  
W. J. KELLEY  
BY  
H. H. Styll & A. K. Parsons  
ATTORNEYS Patented Sept. 30, 1924.

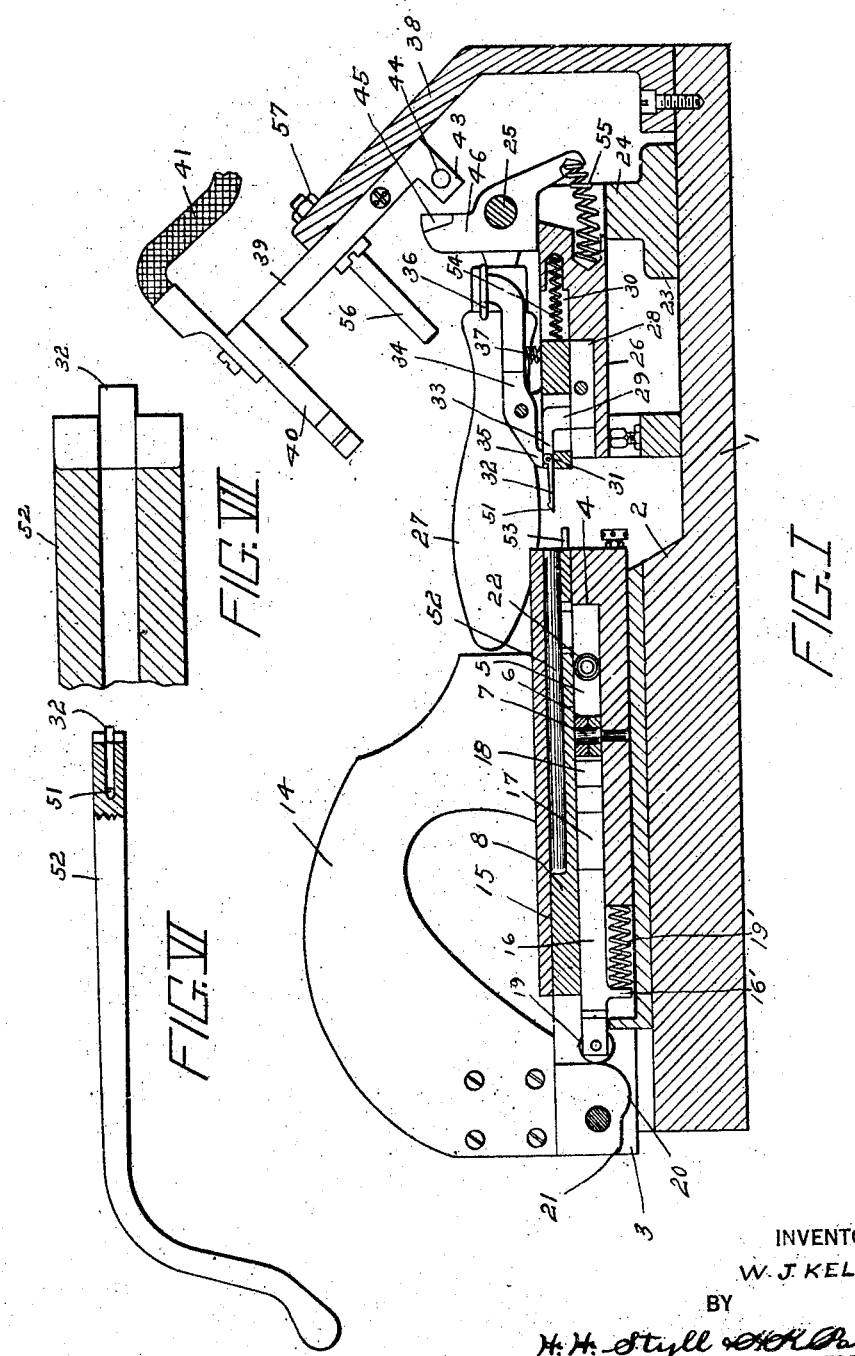

1,510,005

UNITED STATES PATENT OFFICE.

WILLIAM J. KELLEY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

MACHINE FOR INSERTING METAL ENDS IN SPECTACLE TEMPLES.

Application filed September 18, 1922. Serial No. 589,033.

*To all whom it may concern:*

Be it known that I, WILLIAM J. KELLEY, a citizen of the United States, residing at Southbridge, in the county of Worcester and State of Massachusetts, have invented certain new and useful Improvements in Machines for Inserting Metal Ends in Spectacle Temples, of which the following is a specification.

This invention relates to new and useful improvements in optical machinery and more particularly to a device for inserting metallic hinge pieces into zylonite temples. The main object of the present invention being the provision of a machine of the above character wherein the end pieces of a spectacle temple may be readily inserted and embedded within one end of a non-metallic temple for providing a hinge connection between the temple and the frame.

Another object of the invention is the provision of a machine wherein a non-metallic temple is rigidly held in place while an end piece member is embedded within one end of the temple, means being provided for heating the end piece prior to engaging the same with the non-metallic temple so that the end piece can be quickly and readily embedded within the end of the temple, the heated end piece softening the material of the temple so that the end piece can be readily inserted therein and after the temple has cooled the end piece is thoroughly embedded within the material.

With the above and other objects in view the invention consists in the novel features of construction, the combination and arrangement of parts herein-after more fully set forth, pointed out in the claims and shown in the accompanying drawings, in which—

Figure I is a longitudinal sectional view of a machine constructed in accordance with my invention.

Figure II is a detail side elevation.

Figure III is a top plan view of the temple.

Figure IV is a detail bottom plan view of the temple support shown in Figure III.

Figure V is a sectional view taken on the line V—V of Figure II.

Figure VI is a side elevation of a finished temple, parts being broken away and shown in cross section.

Figure VII is an enlarged section of the end of the temple showing the end piece in position.

In carrying out my invention I provide a base member 1 having a raised portion 2 at one end thereof and mounted for sliding movement upon the raised portion 2 is a carriage member 3, the upper face of said carriage member being recessed longitudinally thereof as at 4 and arranged within the recess are the pivoted arms 5, said arms having inwardly extending lugs 6 which are perforated and adapted to be mounted upon the pivot pin 7. Arranged above the recess 4 and secured to the top of the carriage is a bearing plate 8, said plate having a central groove 9 which has a divergent extension at one end thereof forming bearing recesses 10 for the ends of the temples. At the forward end of the groove 9 are the movable jaws 11, said jaws moving over the upper face of the reduced portion 12 at the end of the plate 8 and suitably connected by means of the pins 13 to the arms 5 whereby movement of the arms 5 will impart movement to the jaws 11 tending to move the same toward and away from the end of the temple arranged within the groove 9, the engagement of the jaws with the temples securely retaining the temple in position to be operated upon.

An operating handle 14 is pivotly connected to one end of the carriage 3, the other end of said handle carrying a cover plate 15 which is adapted to be arranged over the upper face of the bearing plate 8 when a temple is in position within the groove 9 to securely retain the temple in position. Slidably mounted within the recess 4 is an actuating bar 16, the inner end of which is tapered as at 17 and adapted to be inserted in between the pivoted fingers 18, said fingers being carried by the arms 5 so that when the bar 16 is moved inwardly between the fingers 18 the jaws 5 will be actuated to impart movement to the jaw 11 for clamping the temple member within the groove 9 to be operated upon.

The arm 16 is provided at its outer ends with a bearing roller 19 which contacts with a cam surface 20 formed upon the handle 14 whereby when the handle 14 is raised to remove the cover 15 from the top of the plate 8 the roller 19 will ride over the cam 20 until it reaches the depressed portion 21 wherein the bar 16 is moved longitudinally to permit the movement of the fingers 18 toward each other actuating the arms 5 for opening the jaws 11, the tension of the coil spring 22 tending to make this movement of a more positive nature so that the jaw 11 may be moved away from each other to permit the insertion of a temple within the groove 9. A finger 16' is also carried by the arm 16 and a spring 19' is adapted to contact therewith to normally urge the arm rearwardly.

After the temple has been placed within the groove 9 the lid 15 is moved down to position over the temple by actuating the handle 14, the movement of the handle carrying the bearing roller 19 over the cam 20 whereby to move the bar 16 inwardly between the jaws 18 closing the jaws 11 thru the actuation of the arms 5.

Mounted upon the base member 1 opposite the raised portion 2 is a block 23 having uprights 24 secured thereto and extending between these uprights is a shaft 25 upon which the carriage 26 is mounted. The carriage 26 is mounted for vertical movement and is preferably secured to the shaft 25 to move therewith and in order to impart movement to the shaft a handle 27 is connected with one end thereof whereby the actuation of the handle will rotate the shaft 25 and raise and lower the carriage 26. The carriage is provided at its inner end with a cutaway portion 28 in which is mounted a stop member 29. An additional cutaway portion 30 is provided in the top of the carriage 26 and mounted therein is a slotted member 31 upon which the end piece 32 rests. It will be apparent from Figure I that the stop portion of the member 29 is extended into this slot and has a reduced end 33 which is adapted to abut against the inner end of the end piece 32 when the same is in position as shown in Figure I to hold the same against longitudinal movement during the main operation.

The end piece 32 is securely held in position by means of a pivoted fingerpiece 34, one end of which has a turned down portion 35 which is adapted to contact with the upper face of the end piece 32 for retaining the same in position upon the member 31. When it is desired to place one of the end pieces in position for use, the thumb piece 36 at the inner end of the finger 34 is pressed downwardly, raising the end 35 so that the temple end may be placed beneath the same, the coil spring 37 moving the end 35 downwardly into contact with the end piece for retaining the same in position.

Extending upwardly from the end of the base 1 opposite the raised portion 2 is an angular bracket 38 supporting the pivoted arms 39, the outer ends of which are provided with the heating plates 40 having the wires 41 connected thereto. The lower ends of the plates 40 are each provided with a transverse groove whereby to receive the temple end 32 when the carriage 26 is in a raised position as shown in Figure II. The arms 39 are provided at their other ends with adjustable screw members 42 which extend thru the turned down ends 43 of said arms and project into the space between the arms forming contact lugs 44 which are adapted to engage the tapered edges 45 of the arm 46. This arm 46 is carried by the shaft 25 and adapted to move inwardly between the lugs 44 to rock the arms 39 upon their pivots and bring the plates 40 into contact with the temple end piece 32.

In order to keep a circuit for the heating plates 40 an adjustable contact 47 is carried by the arm 48 upon the end of the shaft 25 and is adapted to engage a contact 49 carried by one of the uprights 24 and from this it will be apparent that when the carriage 26 is raised upwardly to the position shown in Figure II the contact 47 will engage the contact 49 completing the circuit to the heating plates 40. As the carriage is raised, the tapered edge 45 will contact with the lugs 44 moving the outer ends of the arms 39 toward each other so as to close the heating plates 40 upon the temple end members 32 whereby when the point 47 contacts with the point 49 the temple end piece will be heated and as the carriage 26 moves downwardly the coil spring 50 will tend to draw the inner ends of the arms 39 toward each other moving the plates 40 in spaced relation.

After the temple end piece 32 has been heated as set forth above and the carriage 26 lowered to the position shown in Figure I the operator will grasp the handle 14 attached to the carriage 3 and move the carriage 3 toward the carriage 26, the pointed end 51 of the temple end piece penetrating the end of the non-metallic temple member 52 and as the temple end piece 32 is in a heated condition and as the temple is formed of a non-metallic material such as zylonite the temple end can be readily forced into the zylonite and after the same cools it will be thoroughly embedded therein.

Attention is called to the fact that as the carriage 3 is moved toward the carriage 26 and the temple end piece embedded within the temple 52 the stop member 53 will contact with the outer end of the member 31 forcing the member 31 inwardly against the coil spring 54, thus releasing the temple end piece 32 by moving the member 31 out from under the said end after the carriage 3 has been returned to its normal position as shown in Figure I. The handle 14 is raised, moving the plate 15 away from the top of the plate 8 so that the temple can be quickly and readily removed from the groove 9 after the end piece 32 has been embedded therein.

I also wish to call attention in Figure 1 to the coil spring 55, one end of which contacts with the opposite end of the rocker arm 46, while the other end thereof engages the body portion of the carriage 26 so that when the carriage 26 is lowered the tension of the spring 55 will positively disengage the tapered faces 45 from the lugs 44.

It will be apparent from the above descriptions taken in connection with the accompanying drawings that I have provided a simple and efficient machine whereby the metal end pieces can be quickly and readily inserted into the ends of non-metallic temples and thoroughly embedded therein so that they will be securely held against withdrawal.

If found desirable a small drill hole may be formed in the end of the temple prior to inserting the end piece therein so as to carry out the insertion of the end piece very readily. This is especially useful when the end piece does not become thoroughly heated in which case it would be rather hard for the same to penetrate the solid end of the zylonite temple.

I also wish to call attention to the stop member 56 which is connected to the angular bracket 38 and against which the carriage 26 abuts, in order to limit the upward movement of the carriage. The upper end of the stop member 56 is provided with a nut 57 whereby said stop may be readily adjusted in accordance with the limit of movement required of the carriage 26.

What I claim is:

1. A machine of the class described including a supporting base, a sliding carriage upon one end thereof, means for supporting a temple in longitudinal position upon said carriage, a swinging carriage member upon the opposite end of the base, means to carry a temple end piece on the swinging carriage, means to swing the swinging carriage, means to contact with the end piece for heating said end piece, and means to move the sliding carriage to force the heated end piece into the temple.

2. A machine of the class described including a base member, a sliding and a swinging carriage mounted upon said base and normally disposed in horizontal opposed relation, means to carry a temple member on one of said carriages, means to carry an end piece on the other carriage, means for heating the end piece and means for moving the first carriage longitudinally for inserting the heated end piece into the end of temple member.

3. A machine of the class described including a supporting base, a sliding carriage mounted upon one end of said base, means for imparting longitudinal movement to said carriage, means forming a stop for gauging the sliding movement of said carriage, means to carry a temple member on said carriage, means on the carriage for imparting movement to the same and a second carriage mounted upon the base opposite the first carriage and means whereby to impart movement to the second carriage as and for the purpose set forth.

4. A machine of the class described including a supporting base, a sliding carriage mounted upon one end of said base, a bearing plate arranged upon the carriage having a receiving groove therein, movable jaws at one end of said groove, a pivoted handle connected to the carriage, a cover plate for said groove carried by one end of the handle and means actuated by the swinging movement of the handle to impart movement to said jaws for engaging and disengaging the same with respect to an object placed within the groove.

5. A machine of the class described including a base member, a sliding carriage mounted upon one end thereof, means to carry a temple on said carriage, a swinging carriage mounted upon the other end of the base, a movable support on the swinging carriage, a means to hold a temple end piece upon the support, a pivoted finger engaging the end piece to retain the same in position upon the support, means for heating said temple end piece and means for moving the sliding carriage toward the swinging carriage for engaging the temple end piece with the end of the temple whereby further movement on the part of the sliding carriage will force the end piece into the temple and a stop member carried by the sliding carriage for engaging the movable support and releasing the temple end piece.

6. A machine of the class described including a base member, a sliding carriage upon one end thereof, means to carry a temple thereon, a swinging carriage upon the other end, means to hold a temple end piece on the swinging carriage, means for heating said end piece and means whereby manual operation will move the sliding carriage longitudinally to engage the heated temple end piece with the temple and embed the same therein.

7. A machine of the character described including a movable carriage member, means to carry a temple end piece thereon, a heating element, means for holding a temple, and means whereby to move said temple end piece into engagement with the heating element and thereafter into engagement with the temple.

8. A machine of the character described, including a movable carriage member, means to hold a temple end piece carried thereby, an electric circuit, a heating element in the circuit, means for holding a temple, means whereby to move said temple end piece into engagement with the heating element to close the circuit and thereafter into engagement with the temple, thereby breaking the circuit.

9. A machine of the class described including a movable carriage, means adapted to retain a temple end piece in position thereon, a heating element, means for holding a temple and manual means for raising and lowering said carriage to successively bring the temple end piece into contact with the heating element and the temple as and for the purpose set forth.

10. A machine of the class described including a movable carriage, means adapted to retain a temple end piece in position thereon, means to heat the end piece, means to hold a temple, means to insert the heated end piece into the temple, an electric circuit and means for completing the circuit upon raising the carriage to contact with the heating element and breaking the circuit upon lowering the carriage to engage the end piece with the temple.

11. In a machine of the class described, means for holding a temple, means for holding a temple end piece, an electric circuit, a heating element in the circuit, means to engage the end piece with the heating element to close the circuit and heat the end piece, and means to force the heated end piece into the temple.

12. In a machine for forcing a metallic member into a non-metallic member, means for holding the non-metallic member, means for holding the metallic member, an electric circuit, heating means in the circuit, means to engage the metallic member with the heating means to close the circuit and heat the metallic member, and means to force the heated metallic member into the non-metallic member.

WM. J. KELLEY.